United States Patent
Selvaraj

(10) Patent No.: US 8,817,584 B1
(45) Date of Patent: Aug. 26, 2014

(54) DEFECT RECORD SEARCH

(71) Applicant: Western Digital Technologies, Inc., Irvine, CA (US)

(72) Inventor: Gomez S. Selvaraj, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/781,428

(22) Filed: Feb. 28, 2013

(51) Int. Cl.
*G11B 5/58* (2006.01)

(52) U.S. Cl.
USPC ..................................... 369/53.41

(58) Field of Classification Search
USPC ........... 369/53.1, 53.15, 53.41; 711/112, 113, 711/118; 714/3
See application file for complete search history.

(56) References Cited

U.S. PATENT DOCUMENTS

| | | | |
|---|---|---|---|
| 5,075,804 A | 12/1991 | Deyring | |
| 5,235,558 A | 8/1993 | Woodsum et al. | |
| 5,235,585 A | 8/1993 | Bish et al. | |
| 5,615,190 A | 3/1997 | Best et al. | |
| 5,768,044 A | 6/1998 | Hetzler et al. | |
| 5,937,435 A | 8/1999 | Dobbek et al. | |
| 5,983,309 A | 11/1999 | Atsatt et al. | |
| 6,105,104 A * | 8/2000 | Guttmann et al. | 711/4 |
| 6,201,655 B1 | 3/2001 | Watanabe et al. | |
| 6,289,484 B1 | 9/2001 | Rothberg et al. | |
| 6,535,995 B1 | 3/2003 | Dobbek | |
| 6,778,480 B2 | 8/2004 | Nadershashi et al. | |
| 7,155,640 B2 | 12/2006 | Nam | |
| 7,234,021 B1 * | 6/2007 | Chilton | 711/113 |
| 7,548,944 B2 * | 6/2009 | Sahita | 709/200 |
| 7,672,976 B2 | 3/2010 | Tobin et al. | |
| 7,916,421 B1 | 3/2011 | Liikanen et al. | |
| 2005/0144509 A1 | 6/2005 | Zayas | |
| 2007/0174736 A1 * | 7/2007 | Yoshida | 714/53 |

* cited by examiner

*Primary Examiner* — Brenda Bernardi

(57) ABSTRACT

A disk drive including a disk storing a defect log including one or more defect records, wherein each of the defect records comprises record fields, and a controller configured to determine a match for a reference defect record by at least selecting one or more record fields of the reference defect record as search fields, setting the search fields in the reference defect record, generating a mask record comprising mask fields corresponding to the record fields, setting a first bit value for each bit in the mask fields corresponding to the search fields and a second bit value for each bit in the mask fields which do not correspond to the search fields, selecting a defect record from the defect log, generating an intermediate result by performing a first logic operation, and generating a matching result by performing a second logic operation.

24 Claims, 11 Drawing Sheets

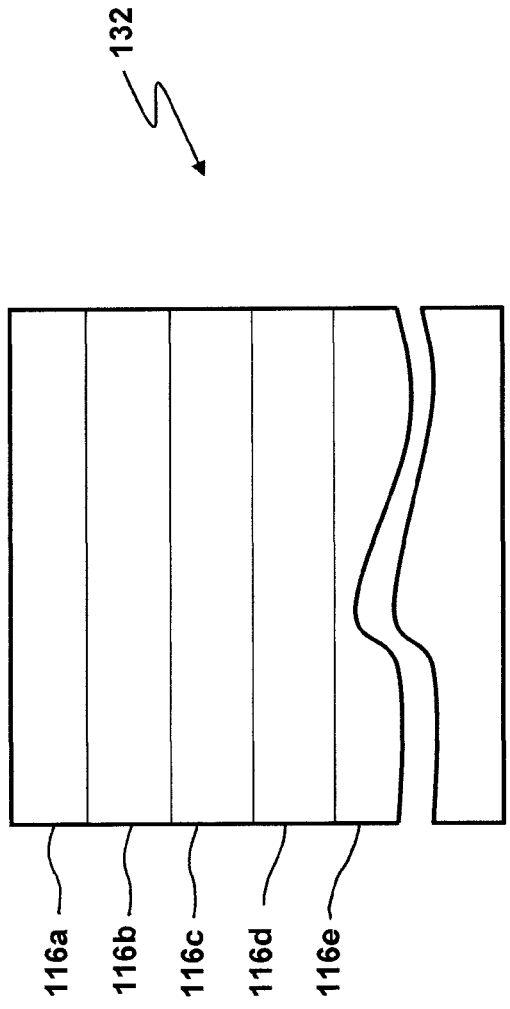
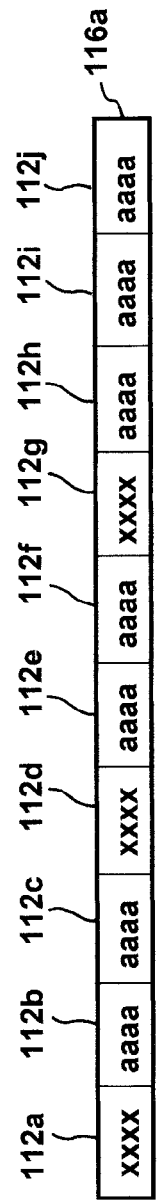
FIG. 3
FIG. 4

| 112a | 112b | 112c | 112d | 112e | 112f | 112g | 112h | 112i | 112j |
|------|------|------|------|------|------|------|------|------|------|
| xxxx | 0000 | 0000 | xxxx | 0000 | 0000 | xxxx | 0000 | 0000 | 0000 |

DEFECT RECORD SEARCH

BACKGROUND

A disk drive comprises a disk which may contain defects from a manufacture of the disk or through wear and tear over time. Such defects may make portions of the disk unusable and are mapped in a defect log to prevent accidental storage of data in the defect.

To identify the defects, the defect log contains defect records. Each of the defect records contain record fields. In some situations such as during failure analysis or to determine whether to perform defect management, it may be beneficial to search for a specific defect record in the defect log, or many defect records which match certain search criteria. To search the defect records in the defect log, selected record fields in each of the defect records are searched to determine when the desired defect records have been found.

However, conventional searching of the defect log utilizes many iterations to complete the search. The large number of iterations can increase a time utilized to display the search results. Furthermore it can utilize a large number of resources to display the search results.

BRIEF DESCRIPTION OF THE DRAWINGS

The features and advantages of the present embodiments will become more apparent from the detailed description set forth below when taken in conjunction with the drawings, wherein:

FIG. 3 depicts a defect log comprising defect records according to an embodiment;

FIG. 4 depicts a defect record comprising record fields according to an embodiment;

FIG. 6 depicts a reference defect record comprising record fields according to an embodiment;

DETAILED DESCRIPTION

Figure 1:
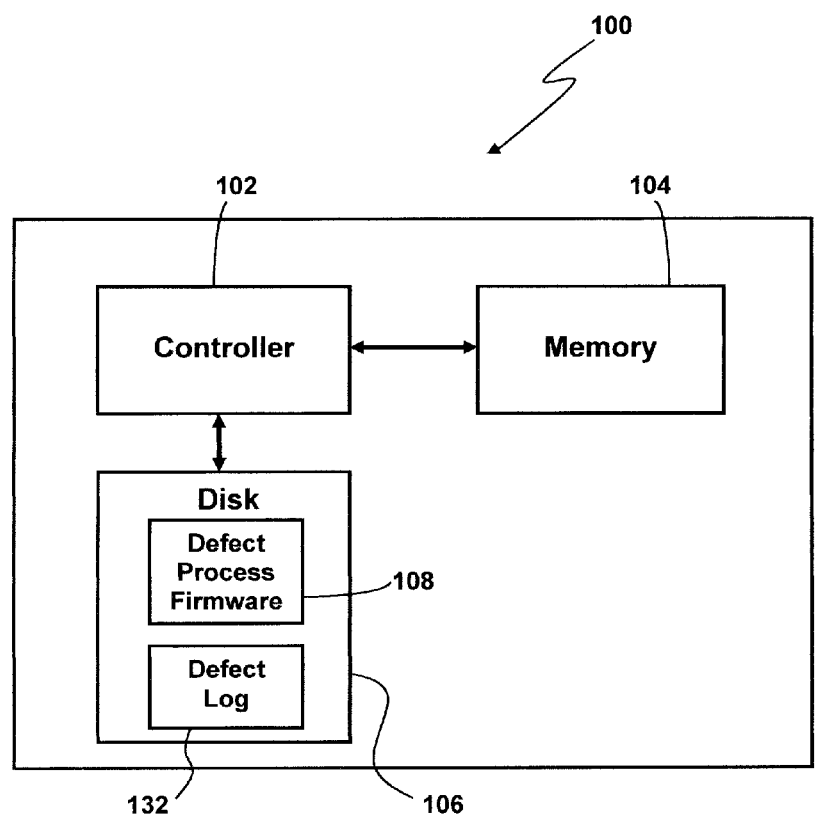
FIG. 1 depicts a disk drive according to an embodiment.

In an embodiment, as shown in FIG. 1, a disk drive 100 includes a controller 102, a memory 104, and a disk 106. In an embodiment, the disk 106 stores a defect process firmware 108 and a defect log 132. In an embodiment, the disk 106 is a persistent memory while the memory 104 is a non-persistent memory. In an embodiment, the disk 106 is a rotating disk such as a magnetic rotating disk. In an embodiment, the memory 104 is a random-access memory such as a DRAM.

In an embodiment, the defect process firmware 108 is loaded from the disk 106 onto the memory 104. When executed, the defect process firmware 108 causes the controller 102 to perform a defect process on the disk drive 100.

Figure 2:
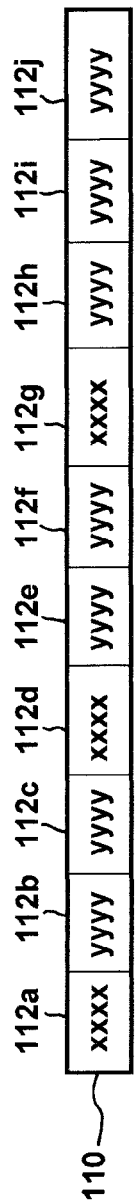
FIG. 2 depicts a reference defect record comprising record fields according to an embodiment.

In an embodiment, as shown in FIG. 2 a reference defect record 110 is utilized for the defect process. The reference defect record 110 comprises one or more record fields 112a-112j. In an embodiment, as shown in FIG. 3, the defect log 132 includes defect records 116 such as defect records 116a, 116b, 116c, 116d, and 116e. Although the defect records 116a-116e are shown, the defect log 132 can comprise more or less defect records. In an embodiment, the defect records 116 form a linked list. In an embodiment, the defect records 116, such as the defect record 116a, also comprise the record fields 112a-112j, as shown in an embodiment in FIG. 4. In an embodiment, the defect records 116 need not comprise the record fields 112a-112j, but instead could comprise more or less record fields. In an embodiment, each of the record fields 112a-112j comprises 16 bits. In an embodiment, each of the record fields 112a-112j comprises 32 bits.

In an embodiment, the record fields 112a-112j comprise a head number field, a cylinder value field, a sequence field, a defect type field, a start wedge field, an end wedge field, a wedge in error field, a zone number field, an error code field, a partition ID field, a cluster ID field, a process test module ID field, a flags field, a thermal asperity ("TA") count field, a number of errors field, or a fail value field. Also, in an embodiment, the record fields 112a-112j may comprise additional fields instead of, or in addition to, the fields disclosed above which may be useful for identifying a defect on the disk 106. The head number field, the cylinder field, the sequence field, the defect type field, the start wedge field, and the end wedge field can form, for example, a record key.

In an embodiment, the cylinder value field comprises cylinder values. The cylinder value field comprises, for example, a cylinder highest significant bit ("HSB") value, a cylinder middle significant bit ("MSB") value, and/or a cylinder least significant bit ("LSB") value. Furthermore, in an embodiment, the defect records 116 in the defect log 132 are sorted by the cylinder values in the cylinder value field.

Figure 5:
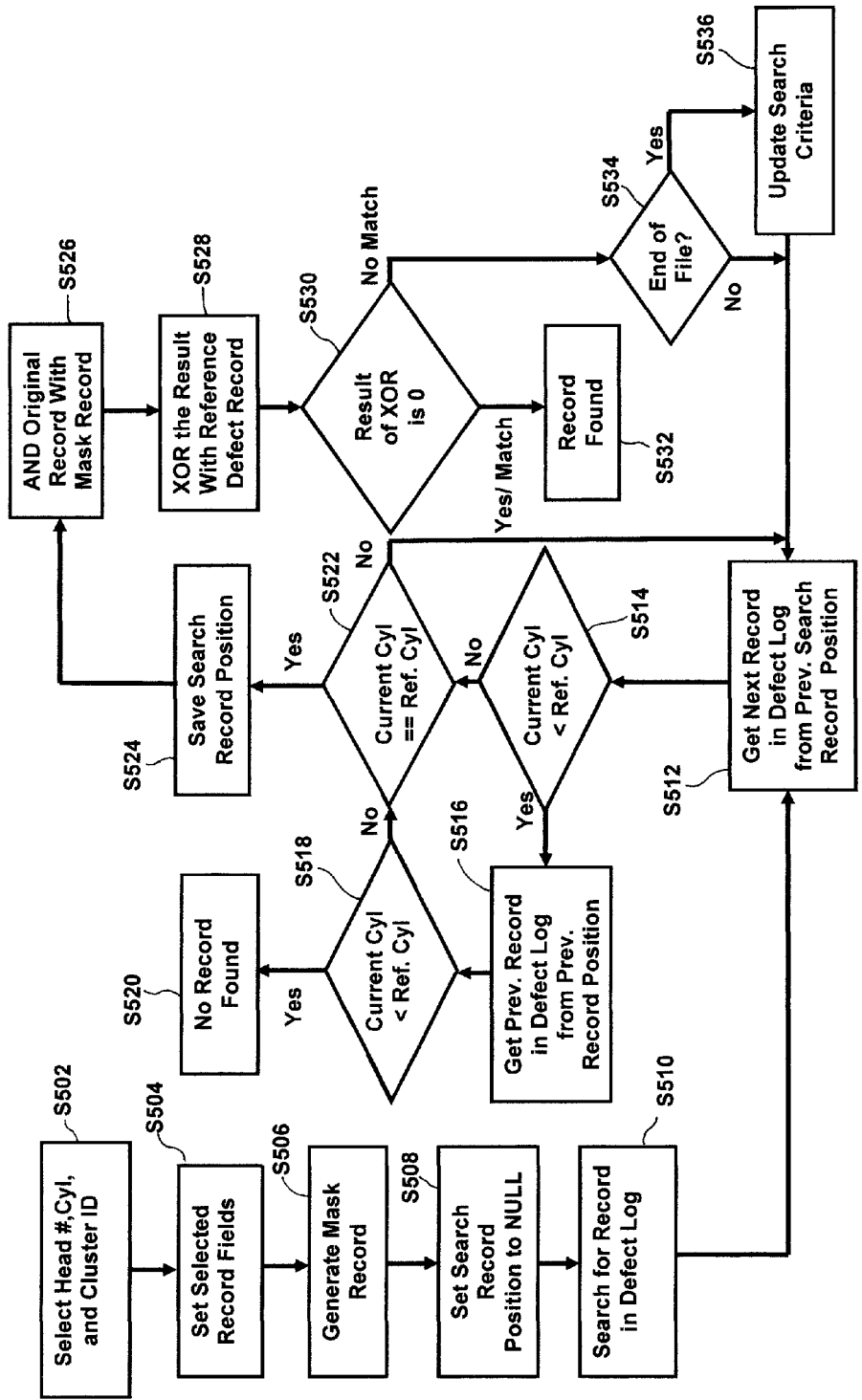
FIG. 5 depicts a process according to an embodiment.

In an embodiment, the defect process comprises one or more blocks shown in FIG. 5. In block S502, the record fields comprising the head number field, the cylinder value field, and the cluster ID field are selected as search fields for the reference defect record 110 as shown in an embodiment in FIG. 2. Therefore, the record fields selected as search fields need not correspond only to fields which comprise the record key. Instead, the record fields selected may correspond to fields which are part of the record key, fields which are not part of the record key, or any combination thereof. In the embodiment shown in FIG. 2, the record fields 112a, 112d, and 112g correspond to the head number field, the cylinder value field, and the cluster ID field.

Thus, the record fields 112a, 112d, and 112g are selected as the search fields as indicated by the "xxxx" values. The "xxxx" values merely indicate that the record fields are selected and do not indicate a specific value stored in the record fields 112a, 112d, and 112g or that the values stored in the record fields 112a, 112d, and 112g are identical to each other. The record fields 112b, 112c, 112e, 112f, 112h, 112i, and 112j are not selected as indicated by the "yyyy" values. Similarly, the "yyyy" values merely indicate that the record fields 112b, 112c, 112e, 112f, 112h, 112i, and 112 are not selected and do not indicate a specific value stored in the record fields 112b, 112c, 112e, 112f, 112h, 112i, and 112j. In an embodiment, the record fields selected as the search fields can be searched at a same time instead of on an individual basis, which can reduce an amount of time and iterations required for searching.

In an embodiment, although the record fields 112a, 112d, and 112g are selected as search fields, one or more of the record fields 112a-112j may be selected as the search fields instead of the record fields 112a, 112d, and 112g.

In block S502, the record fields 112a, 112d, and 112g selected as search fields are set. In an embodiment, when the record fields 112a, 112d, and 112g are set, the bit values for each bit in the record fields 112a, 112d, and 112g are maintained as shown in an embodiment in FIG. 6. Furthermore, the bits for the other record fields which are not selected as search fields are set to a bit value of "0." For example, each bit in the record fields 112b, 112c, 112e, 112f, 112h, 112i, and 112j are set to a bit value of "0" as indicated by each of the record fields 112b, 112c, 112e, 112f, 112h, 112i, and 112j having a value of "0000" in a hexadecimal format. The value "0000" represents 16 bits with each bit having a bit value of "0." For example, the value "0000" is "0000000000000000" in binary.

Figure 7:
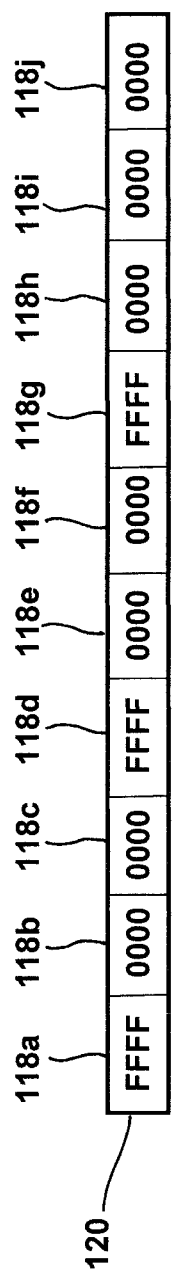
FIG. 7 depicts a mask record comprising mask fields according to an embodiment.

In block S506, a mask record 120 comprising mask fields 118a-118j is generated, as shown in an embodiment in FIG. 7. In the embodiment shown in FIG. 7, the mask fields 118a-118j correspond to the record fields 112a-112j. Each bit in the mask fields 118a-118j corresponding to the search fields of the reference defect record 110 is set to a first bit value. For example, the mask fields 118a, 118d, and 118g correspond to the record fields 112a, 112d, and 118g, which were selected as the search fields. Thus, each bit in the mask fields 118a, 118d, and 118g is set to a first bit value of "1" as shown by the value "FFFF" in a hexadecimal format. In an embodiment, the value "FFFF" represents 16 bits, with each bit having a bit value of "1." For example, the value "FFFF" is "1111111111111111" in binary. In contrast, each bit in the mask fields 118b, 118c, 118e, 118f, 118h, 118i, and 118j, which do not correspond to the search fields are set to a second bit value of "0" as shown by the value "0000" in a hexadecimal format.

In block S508, a search record position is set to NULL. In an embodiment, the search record position is a marker of a current defect record for analysis in the defect log 132. In block S510, a search for a defect record in the defect log 132 which matches the reference defect record 110 begins. In block S512, the next record in the defect log 132 from the previous search record position is retrieved and set as the current defect record. For example, if the search record position was set to NULL, then the next defect record would be the first defect record in the defect log 132. For example, as shown in an embodiment in FIG. 3, the first defect record would be the defect record 116a. Thus, the defect record 116a would be set as the current defect record. However, if the search record position was set to the defect record 116a, then the next defect record would be the defect record 116b. The defect record 116b would then be set as the current defect record.

In block S514, a determination is made as to whether the cylinder value in the current defect record is greater than the cylinder value in the reference defect record 110. For illustrative purposes, the current cylinder value in block S514 (the cylinder value in the current defect record in block S514) can be considered a first cylinder value. If the cylinder value in the current defect record (first cylinder value) is greater than the cylinder value in the reference defect record 110, then the previous defect record from the current defect record is retrieved from the defect log 132 in block S516. Furthermore, the previous defect record from the current defect record is set as the current defect record. For example, if the current defect record is the defect record 116b, then the previous defect record, the defect record 116a, will be set as the current defect record. Similarly, if the current defect record is the defect record 116c, then the previous defect record, the defect record 116b, will be set as the current defect record. Otherwise the process proceeds to block S522, which will be described below.

If the cylinder value in the current defect record is less than the cylinder value in the reference defect record 110 in block S518, then there are no records found as indicated in block S520. Otherwise, the process proceeds to block S522. For illustrative purposes, the current cylinder value in block S518 (the cylinder value in the current defect record in block S518) can be considered a second cylinder value.

In block S522, a determination is made as to whether the cylinder value in the current defect record matches the cylinder value in the reference defect record 110. In an embodiment, the cylinder value in the current defect record in block S522 is the first cylinder value (block S514) or the second cylinder value (block S518). If there is a match, the process proceeds to block S524 where the position of the current defect record is saved as the search record position. Otherwise, the process repeats at block S512.

Figure 8:
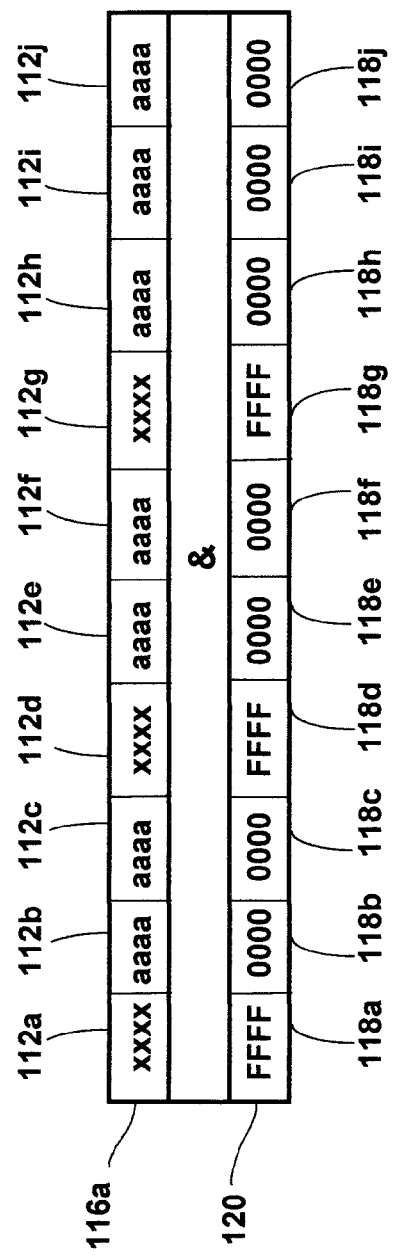
FIG. 8 depicts a logic operation being performed on a selected defect record and a mask record according to an embodiment.

For blocks S526-S536, the current defect record is assumed to be the defect record 116a for illustrative purposes only. In block S526, a bitwise AND operation is performed on the current defect record and the mask record 120. For example, as seen in FIG. 8 a bitwise AND operation is performed between the defect record 116a and the mask record 120. This generates an intermediate result 124 comprising intermediate result fields 122a-122j as shown in an embodiment in FIG. 9.

Figure 9:
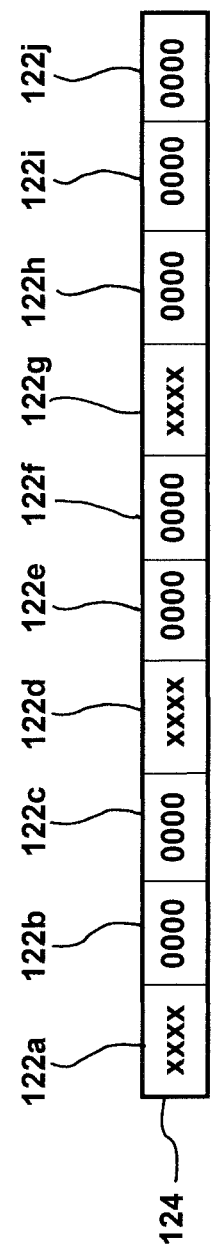
FIG. 9 depicts an intermediate result according to an embodiment.

As can be seen in the embodiment shown in FIG. 9, the intermediate result fields 122a, 122d, and 122g maintain the same values as the record fields 112a, 112d, and 112f in the defect record 116a. However, each bit in the other intermediate result fields 122b, 122c, 122e, 122f, 122h, 122i, and 122j have a bit value of "0" instead of the values indicated by "aaaa" of the record fields 112b, 112c, 112e, 112f, 112h, 112i, and 112j in the defect record 116a. In an embodiment, the bitwise AND operation passes through the values in the record fields 112a, 112d, and 112f, but not the values in the record fields 112b, 112c, 112e, 112f, 112h, 112i, and 112j in the defect record 116a.

Figure 10:
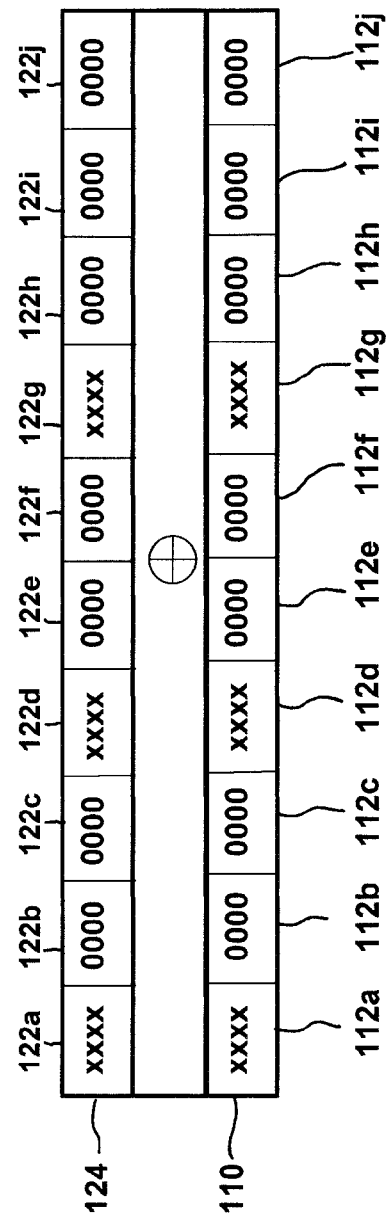
FIG. 10 depicts a logic operation being performed on an intermediate result and a reference defect record according to an embodiment.

In block S528, a bitwise XOR operation is performed on the reference defect record 110 and the intermediate result 124 as seen in an embodiment shown in FIG. 10. This generates a matching result 128 comprising matching result fields 126a-126j as seen in an embodiment in FIG. 11.

In block S530, a determination is made regarding whether each bit in the matching result fields 126a-126j of the matching result 128 has a bit value of "0." In block S532, the matching result 128 indicates that the current defect record matches the reference defect record 110 when each bit in the matching result fields 126a-126j of the matching result 128 has a bit value of "0." In an embodiment, defect management may not be performed based on the reference defect record 110 since the defect may already have been identified in the defect log 132.

The matching result 128 indicates that the current defect record does not match the reference defect record 110 when at least one bit in the matching result fields 126a-126j of the matching result 128 has a bit value of "1." When the current defect record does not match the reference defect record 110, the process proceeds to block S534 where a determination is made as to whether the end of the defect log 132 has been reached. If the end of the defect log 132 has not been reached, then the process repeats at block S512.

Otherwise, if the end of the defect log 132 has been reached, then the reference defect record 110 has not been found in the defect log 132. In such a case, in block S536 a search criteria in the reference defect record 110 is updated so that another search may be performed. Furthermore, in an embodiment, the search record position is set to NULL again so that the search can recommence from the first defect record in the defect log 132. In an embodiment, defect management may also be performed based on the reference defect record 110 since the defect has not been previously identified.

Figure 12:
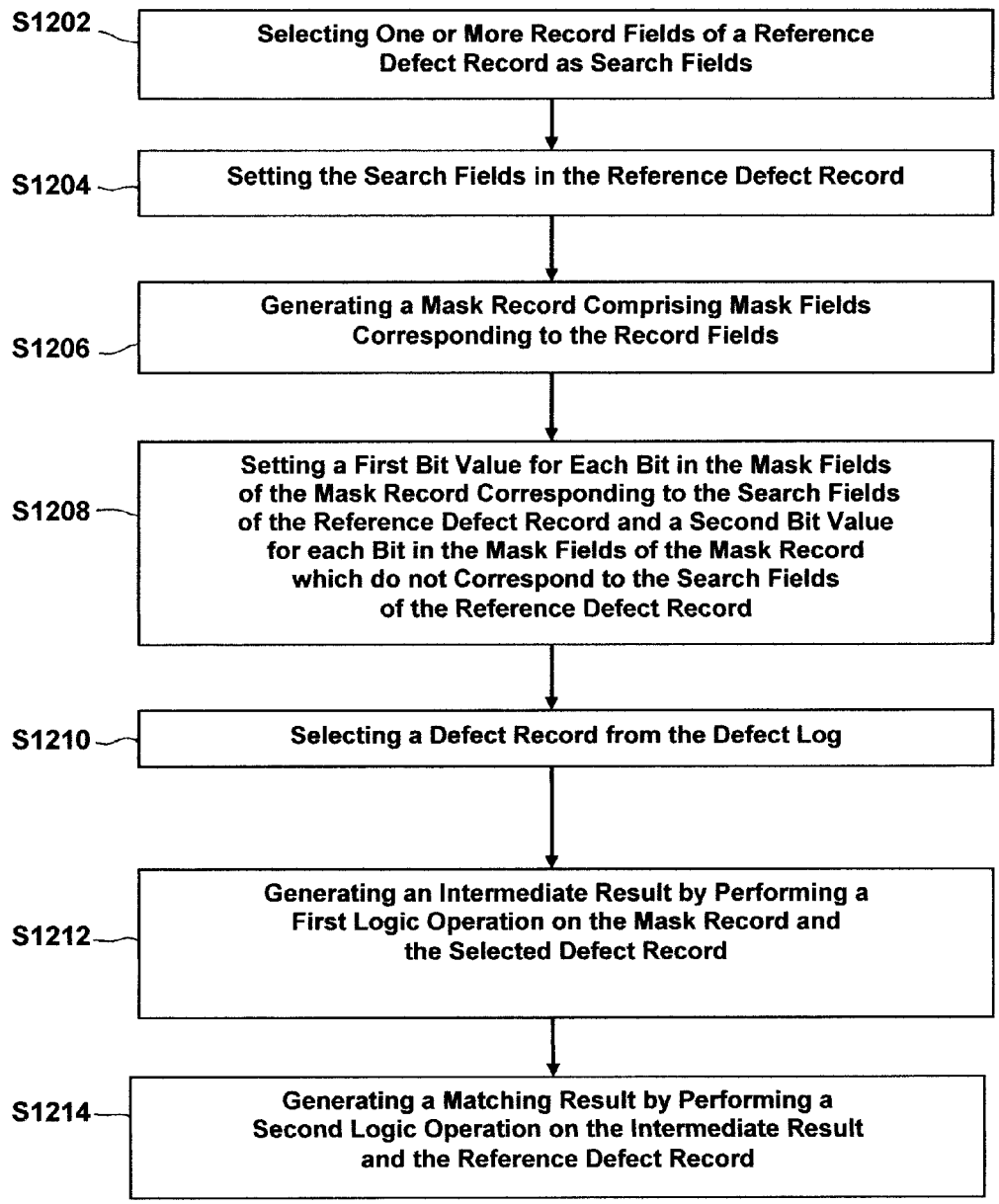
FIG. 12 depicts a process according to an embodiment.

In an embodiment, the defect process comprises one or more blocks shown in FIG. 12. In block S1202, one or more record fields of the reference defect record 110 is selected as search fields. For example, the record fields 112a, 112d, and 112g are selected as search fields as indicated by the "xxxx" value in an embodiment shown in FIG. 2. The other record fields 112b, 112c, 112e, 112f, 112h, and 112i are not selected as search fields as indicated by the "yyyy" value.

In block S1204, the search fields in the reference defect record 110 is set as shown in an embodiment in FIG. 6. For example, the bit values for the search fields (record fields 112a, 112d, and 112g) are maintained, while each bit of the record fields 112b, 112c, 112e, 112f, 112h, 112i, and 112j, which were not selected as the search fields, is set to a bit value of "0."

In block S1206, a mask record 120 comprising mask fields 118a-118j corresponding to the record fields 112a-112j is generated as shown in an embodiment in FIG. 7. In block S1208 each bit in the mask fields of the mask record 120 corresponding to the search fields of the reference defect record 110 is set to a first bit value, and each bit in the mask fields of the mask record 120 which do not correspond to the search fields of the reference defect record 110 is set to a second bit value.

For example, each bit in the mask fields 118a, 118d, and 118g of the mask record 120 corresponding to the search fields of the reference defect record 110 is set to a first bit value as shown in an embodiment in FIG. 7. Furthermore, each bit in the mask fields 118b, 118c, 118e, 118f, 118h, 118i, and 118j, is set to a second bit value as shown in an embodiment in FIG. 7. In an embodiment the first bit is "1" and the second bit value is "0." Thus, each of the mask fields 118a, 118d, and 118g has a value of "FFFF" and each of the mask fields 118b, 118c, 118e, 118f, 118h, 118i, and 118j has a value of "0000."

In block S1210, a defect record, such as the defect record 116a, is selected from the defect log 132. In block S1212, an intermediate result 124 is generated by preforming a first logic operation on the mask record 120 and the selected defect record, such as the defect record 116a, as shown in embodiments in FIGS. 8 and 9. In an embodiment, the first logic operation is a bitwise AND operation.

Figure 11:
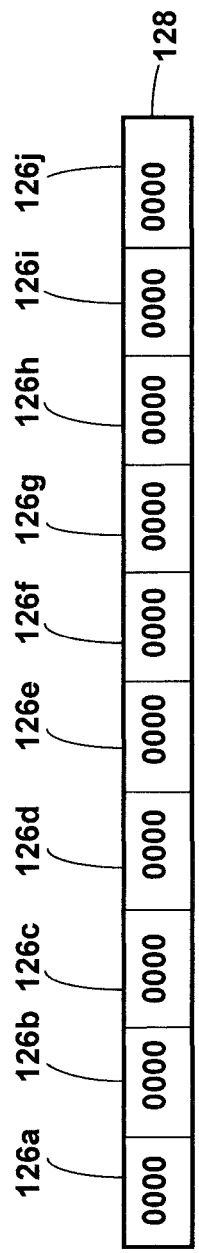
FIG. 11 depicts a matching result according to an embodiment.

In block S1214 a matching result 128 is generated by preforming a second logic operation on the intermediate result 124 and the reference defect record 110 as shown in embodiments in FIGS. 10 and 11. In an embodiment, the second logic operation is a bitwise XOR operation.

In an embodiment, although the above examples utilize the controller 102 to implement the defect process, the defect process could also be implemented using processors in addition to or instead of the controller 102.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:
1. A data storage device comprising:
   a storage medium storing a defect log comprising one or more defect records, wherein each of the defect records comprises record fields, and each of the record fields comprise one or more bits, wherein the defect records in the defect log are sorted by at least one of the record fields; and
   a controller configured to determine a match for a reference defect record comprising the record fields by at least:
      selecting one or more record fields of the reference defect record as search fields;
      setting the search fields in the reference defect record;
      generating a mask record comprising mask fields corresponding to the record fields;
      setting a first bit value for each bit in the mask fields of the mask record corresponding to the search fields of the reference defect record and a second bit value for each bit in the mask fields of the mask record which do not correspond to the search fields of the reference defect record;
      maintaining a marker of a current defect record in the defect log;
      selecting a defect record from the defect log, based on the marker of the current defect record in the defect log;

generating an intermediate result by performing a first logic operation on the mask record and the selected defect record; and generating a matching result by performing a second logic operation on the intermediate result and the reference defect record.

2. The data storage device of claim 1 wherein the first logic operation is a bitwise AND operation.

3. The data storage device of claim 2 wherein the second logic operation is a bitwise XOR operation.

4. The data storage device of claim 3 wherein the matching result indicates that the reference defect record matches the selected defect record when each of the bits in the matching result has a bit value of "0."

5. The data storage device of claim 3 wherein the matching result indicates that the reference defect record does not match the selected defect record when at least one of the bits in the matching result has a bit value of "1."

6. The data storage device of claim 1 wherein the setting the search fields in the reference defect record further comprises:
setting only the search fields in the reference defect record.

7. The data storage device of claim 6 wherein the setting the search fields in the reference defect record further comprises:
maintaining a bit value for each bit in the search fields for the reference defect record; and
setting a bit value of "0" for each bit in the record fields in the reference defect record that are not the search fields.

8. The data storage device of claim 1 wherein one of the record fields comprises a cylinder value, and the defect records in the defect log are sorted by the cylinder value.

9. The data storage device of claim 8 wherein the selecting the defect record from the defect log further comprises:
searching the defect log for a defect record which has a cylinder value that matches a cylinder value of the reference defect record.

10. The data storage device of claim 8 wherein the selecting the defect record from the defect log further comprises:
selecting only a defect record from the defect log which has a cylinder value that matches the cylinder value of the reference defect record.

11. The data storage device of claim 1 wherein the first bit value has a bit value of "1" and the second bit value has a bit value of "0."

12. The data storage device of claim 1 wherein the controller is further configured to determine a match for a reference defect record comprising the record fields by at least:
updating the marker of the current defect record based on the matching result, including when the matching result indicates that the reference defect record matches the selected defect record, and when the matching result indicates that the reference defect record does not match the selected defect record.

13. A method for performing a defect process on a data storage device comprising a storage medium storing a defect log comprising one or more defect records, wherein each of the defect records comprises record fields, each of the record fields comprise one or more bits, and the defect records in the defect log are sorted by at least one of the record fields, and a controller configured to determine a match for a reference defect record comprising the record fields, the method comprising at least:
selecting one or more record fields of the reference defect record as search fields;
setting the search fields in the reference defect record;

generating a mask record comprising mask fields corresponding to the record fields;
setting a first bit value for each bit in the mask fields of the mask record corresponding to the search fields of the reference defect record and a second bit value for each bit in the mask fields of the mask record which do not correspond to the search fields of the reference defect record;
maintaining a marker of a current defect record in the defect log;
selecting a defect record from the defect log based on the marker of the current defect record in the defect log;
generating an intermediate result by performing a first logic operation on the mask record and the selected defect record; and
generating a matching result by performing a second logic operation on the intermediate result and the reference defect record.

14. The method of claim 13 wherein the first logic operation is a bitwise AND operation.

15. The method of claim 14 wherein the second logic operation is a bitwise XOR operation.

16. The method of claim 15 wherein the matching result indicates that the reference defect record matches the selected defect record when each of the bits in the matching result has a bit value of "0."

17. The method of claim 15 wherein the matching result indicates that the reference defect record does not match the selected defect record when at least one of the bits in the matching result has a bit value of "1."

18. The method of claim 13 wherein the setting the search fields in the reference defect record further comprises:
setting only the search fields in the reference defect record.

19. The method of claim 18 wherein the setting the search fields in the reference defect record comprises:
maintaining a bit value for each bit in the search fields for the reference defect record; and
setting a bit value of "0" for each bit in the record fields in the reference defect record that are not the search fields.

20. The method of claim 13 wherein one of the record fields comprises a cylinder value, and the defect records in the defect log are sorted by the cylinder value.

21. The method of claim 20 wherein the selecting the defect record from the defect log further comprises:
searching the defect log for a defect record which has a cylinder value that matches a cylinder value of the reference defect record.

22. The method of claim 20 wherein the selecting the defect record from the defect log further comprises:
selecting only a defect record from the defect log which has a cylinder value that matches the cylinder value of the reference defect record.

23. The method of claim 13 wherein the first bit value has a bit value of "1" and the second bit value has a bit value of "0."

24. The method of claim 13 further comprising:
updating the marker of the current defect record based on the matching result, including when the matching result indicates that the reference defect record matches the selected defect record, and when the matching result indicates that the reference defect record does not match the selected defect record.

* * * * *